Dec. 24, 1968  A. A. POLLIA  3,418,009
FLANGED PIPE JOINT
Filed Nov. 22, 1966  2 Sheets-Sheet 1

INVENTOR.
ANDREW A. POLLIA
BY
Schapp & Hatch
ATTORNEYS

Dec. 24, 1968   A. A. POLLIA   3,418,009
FLANGED PIPE JOINT

Filed Nov. 22, 1966   2 Sheets-Sheet 2

INVENTOR.
ANDREW A. POLLIA
BY Schapp & Hatch
ATTORNEYS

3,418,009
FLANGED PIPE JOINT
Andrew A. Pollia, San Francisco, Calif., assignor to Raphael T. Pollia, San Francisco, Calif.
Filed Nov. 22, 1966, Ser. No. 596,138
7 Claims. (Cl. 285—39)

ABSTRACT OF THE DISCLOSURE

A flanged pipe joint and a method and tool for assembling same, in which the flanged pipe joint comprises a flanged hub for fitting over the end of a pipe to be joined to a flanged pipe element, a fastening ring fitting over the flanged hub and sized to fit laterally against the flange thereof with the ring having substantially circular inside and vertical outside whereby tightening forces of the ring against the flange will be substantially entirely axial and allow relative rotation thereof after assembly under severe conditions of stress; said fastening ring having a plurality of spaced holes for receiving securing bolts, and holding means for holding the fastening ring in position on the hub with the fastening ring held for relative rotation with respect to the hub whereby the ring may be manually rotated upon assembly to align the bolts. The construction provides for connecting the hub to the pipe end by either fitting it thereover and welding it in place or by screwing onto the pipe end; when welding, the construction provides advantages in relative masses of metal at the welding area whereby a superior weld may be achieved, and in the embodiment for screwing the hub on, longitudinally extending recesses are provided to receive a tool suitable for tightening the hub on the pipe. The invention also provides for a novel method of assembly and tool therefor whereby the flange may be quickly and easily assembled in field conditions.

---

The present invention relates to improvements in a flanged pipe joint and a method and tool for assembling same.

Flanged pipe fittings are well known and are especially suitable for providing strong, tight pipe joints on large metal pipes. Although these pipe joints have been eminently suitable for the purpose and have been in widespread use for many years, certain minor problems are encountered by the pipefitter in providing a proper pipe joint, and the solution of these problems involves additional labor by the pipe fitter and, in some cases, a slightly inferior pipe joint.

The most serious problem of this nature involves the alignment of the holes on adjacent fittings so that the holes may receive the bolts for providing the coupling of the fitting in an easy manner and without producing any unwanted strain on the pipe that could cause breakage. When threaded pipes are used, it is difficult to provide a completely tight threaded engagement of the flange and at the same time provide alignment. In order to do so, it is usually necessary to stop the threaded process slightly short of the actual snug position desired so that the holes from adjacent pipes will be in alignment. In addition, the flanges generally need to be screwed into position by a tool fitting over the end of the pipe so that actual alignment is very difficult to achieve visually. This problem is also encountered when the pipe flanges are welded instead of threaded, because the present flanged fittings must be placed in accurate position prior to welding in order to achieve the desired alignment.

This problem is particularly acute when it is necessary to repair a pipe line composed of sections of flanged pipes where one of the pipe sections or one of the fittings is damaged. In such a case, the defective section is removed and a new section conforming to the size of the damaged section is substituted for the defective section and assembled in position. Although the flanged pipe fitting is similar in character to a pipe union, it is very difficult to provide this repair and obtain the necessary alignment mentioned above.

Where flanged pipe fittings are welded onto pipe ends, another problem is encountered which is due to the comparatively large size of the flanged fitting in comparison to the main body of the pipe and the variation in heat transfer characteristics that provides temperature differences tending to cause warpage. This warpage affects the finished end of the flange adapted to provide the seal in the joint. Accordingly, it is general practice to assemble both sides of the flanged fitting and weld the entire assembly so that the machined faces of the flange will remain in close position and any warping will be uniform so that a seal may still be achieved. It has been found that pipe fittings made according to the present invention may be welded without such additional assembly or labor because of the construction of the fitting of this invention. In this way, the welding process is simplified and a better and more desirable joint is achieved.

Another problem which has been encountered in flanged pipe is the cost problem involved where chemically resistant or expensive pipes are to be joined and it is necessary to utilize a flange of similar material to provide the necessary chemical resistance, and at the same time provide the strength desired for the coupling. Another problem that has been encountered in pipe fittings has been due to damage resulting from excessive rotational strains on the pipe. These strains may be caused by extreme service conditions in hydraulic pumping, situations that provide rotational forces from water hammer effects, or by minor earthquakes that provide twisting forces.

In a typical flanged pipe joint, the strains tend to shear the securing bolts and break the coupling. Thus, it is seen that although conventional flanged pipe fittings are generally suitable for their use, considerable improvements in said joints may be achieved and it is the objective of the present invention to provide such improvements and overcome the problems mentioned above.

Thus, it is a primary object of the present invention to provide an improved flanged pipe joint which may be tightened or secured in any rotational position, with the bolt holes in the pipe flange being alignable in any desired rotational position.

Another object of the invention is to provide a pipe joint of the character described in which shear stresses on the bolts and the pipe joints are reduced to a minimum or substantially eliminated.

A further object of the invention is to provide a flanged pipe joint of the character described which is easily and quickly assembled, disassembled, and which retains its form so that the joints remain substantially interchangeable with similar joints of the same size under service conditions.

A still further object of the invention is to provide a flanged pipe joint which is simple in construction and yet which may be fabricated with economy of expensive materials by utilizing expensive materials for a part of the construction and relatively inexpensive materials for other parts of the construction, with this distribution of materials being achieved without any additional processing expense.

Still another object of the invention is to provide a pipe joint of the character described which is adapted to be secured to the pipe end by welding in which the welding characteristics of the pipe joint are improved so that welding may be achieved with less injury to the pipe joint and thereby facilitate the welding operation.

Further objects and advantages will become apparent as the specification continues, and the new and useful features of this improved flanged pipe joint and method and tool for assembling same will be fully defined in the claims attached hereto.

In its broad aspect, either or both of the single flanged fittings now used in flanged pipe joints are substituted by a flange fitting constructed according to the invention in which the flanged fitting is made of two separate elements. These elements are constructed to fit together and function for fastening the pipe ends in the usual manner while achieving the above-mentioned objects of advantage.

Specifically, the pipe fitting constructed according to the invention comprises a hub section which is screwed or welded onto the end of the pipe in the usual manner and has a finished facing for tightly abutting against a finished facing of an opposed fitting and providing a seal therewith through the use of a conventional gasket or gasket means. This hub section is constructed with a main body and a flange which is large enough to be strongly engaged by the second pipe element in the form of a fastening ring which fits tightly over the main body of the hub and against the flange thereof. The fastening ring may be of a variety of configurations so long as it is constructed to receive bolts and operate with a similar fastening ring of an adjacent coupling to clamp the hub sections together and provide the necessary seal.

Although the fitting thus described is particularly adapted to be matched with a similar fitting to achieve a coupling, it will be appreciated that this fitting may be utilized on one section of a pipe and coupled against any standard flanged fitting on another end, such as conventional flanged fittings on pipes or flanged valves or any other units. Thus, a pipe joint constructed according to the invention may consist of either one or two of the improved flange fittings described herein.

In addition to being constructed in two sections in the form of a hub and a fastening ring, the flanged fitting constructed according to the invention also preferably contains means for holding the fastening ring in position on the hub section, with the fastening ring being held for relative rotation with respect to the hub so that the fastening ring may be swiveled into the desired position during installation and achieve the alignment desired. The hub section may be internally threaded or made smoothly where it is desired to provide welded joints. In either case, advantages are achieved by the invention by allowing tighter fastening of the threaded fitting or by allowing a better weld to be achieved.

With the fastening ring being held in a swivelable relation to the hub section, it is not only easy to install the pipe fitting of this invention, but also it will relieve shear strains on the bolts under extremely adverse conditions. In other words, the pipe joint of this invention will be free to swivel under extreme forces. However, it should be understood that this is not a swivel joint because the clamping achieved by the bolts on the fastening rings will force the rings very tightly against the flanges of the hubs and this vice-like grip will ordinarily prevent swivel. Nevertheless, under the extreme conditions sometimes encountered in the field, something has to give and the swiveling will occur preferentially to shearing of the bolts.

The preferred forms of the invention are illustrated in the accompanying drawing forming a part of this description, in which.

While only the preferred forms of the invention are shown, it should be understood that various changes or modifications may be made within the scope of the claims attached hereto without departing from the spirit of the invention.

Figure 1:
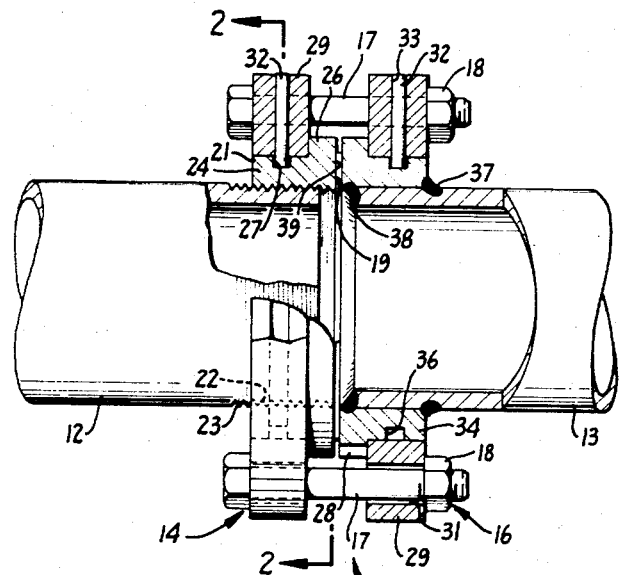
FIGURE 1 is an elevational view, partly in section, illustrating a coupling that may be made by utilizing two different forms of pipe fittings constructed according to the invention.

Referring to the drawings in greater detail, there is shown in FIGURE 1 a pipe joint 11 through which pipes 12 and 13 are joined in end-to-end relation. The pipe joint comprises a flanged fitting 14 threaded onto pipe 12, a flanged fitting 16 welded onto pipe 13, and bolt-type fastening means including bolts 17 and nuts 18 for pulling flanged fittings 14 and 16 clampingly together and squeezing sealing gasket 19 therebetween to provide a tight flanged pipe joint. As shown in FIGURE 1, the pipe joint may comprise different flanged fittings within the same joint or utilize one of the flanged fittings constructed according to the invention to connect to the flange of a pump or other special flanged connection, as well as providing a coupling in which the fittings are exactly alike.

Figure 2:
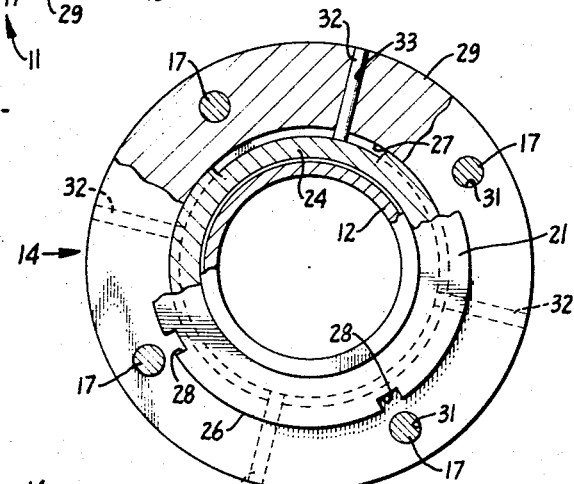
FIGURE 2 is an end view, partly in section, showing the pipe joint of FIGURE 1 substantially as seen in the line 2—2 thereof.
Figure 3:
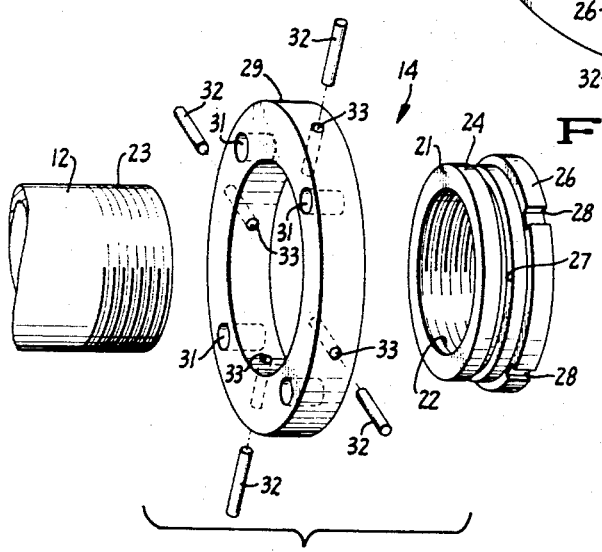
FIGURE 3 is an exploded view of the elements utilized in one of the pipe fittings of the pipe joint shown in FIGURE 1, illustrating these elements in greater detail.
Figure 4:
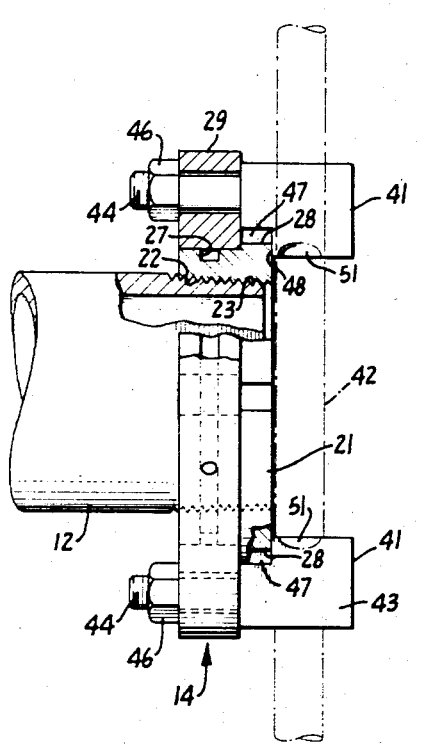
FIGURE 4 is an elevational view, partly in section, illustrating the manner in which the fitting shown in FIGURE 3 is installed on a pipe end.

As best seen in FIGURES 1 through 3, the flanged fitting 14 comprises a flanged hub 21 which has internal threads 22 sized to fit external threads 23 of pipe 12. The hub 21 is formed with a main body 24 and a circular flange 26 at one end thereof, with the main body 24 containing a circumferentially-extending groove 27 on an external surface thereof. In a preferred threaded form, the flange 26 also contains a plurality of axially extending recesses 28 on the external surface thereof, with the recesses corresponding in number and spacing with the bolts to be utilized for fastening as hereinafter described.

The pipe fitting 14 also comprises a fastening ring 29 having a plurality of spaced holes 31 each sized for receiving a securing bolt 17, and holding means for holding the fastening ring in position on the hub, with the fastening ring held for relative rotation with respect to the hub. As shown in FIGURE 3, the holding means comprises a plurality of pins 32 which are driven through holes 33 in the fastening ring 29, with the pins being driven therein and held tightly by close engagement within the holes.

While solid pins 32 are shown in tightly fitting engagement within holes 33 to provide holding means extending within the groove 27 to provide assembly between the fastening ring and the hub, it will be appreciated that other elements could be used to extend within the groove 27 to provide a composite fitting with the fastening ring being swivelable with relation to the hub prior to assembly of the coupling. For example, it has been proposed to make the ring 29 as a split ring and to provide an internal flange to serve the function of the extending pins 32, with the internal flange fitting within the groove 27 and the split ring welded together after assembly. However, this construction is much more expensive to fabricate than the preferred form shown in the drawings, and therefore belongs in a non-preferred class. Nevertheless it illustrates how certain of the principles of the invention may be utilized in broader form.

Although the hub and fastening ring could be provided as separate entities, it is preferred to assemble the threaded hub and the fastening ring prior to shipment and screw the fitting onto the pipe in accordance with the procedure to be given hereinafter. On the other hand, where the fitting is to be welded, such as with fitting 16, it is preferred to keep the fastening ring and hub separate so that welding may be facilitated.

Referring again to FIGURE 1, it is seen that the fitting 16 comprises a flanged hub 34 which is constructed similarly to the flanged hub 21 except that no internal threads are provided and no grooves are provided on the flange. However, the flanged hub 34 does have a circumferentially-extending groove 36 which is similar to groove 27 of fitting 14 and is adapted to receive the holding means of the fitting. The coupling 16 also comprises a fastening ring 29 which is labeled with the same number as the fastening ring of fitting 14 because this fastening ring is constructed in exactly the same way, and contains the pins 32 driven through holes 33 and tightly held thereby with the ends thereof seated in groove 36, as well as the holes 31 adapted to receive bolts 17.

In assembly of the fitting 16, it is preferred to slip the fastening ring over the end of the pipe and then weld the flanged hub 34 into position by providing main weld 37 and sealing weld 38 in accordance with standard procedures for welding flanged fittings onto pipes. However, the welding procedure is much easier because the relative heat characteristics of the flanged hub are sufficiently similar to those of the pipe that uniform heating is achievable and warping of the hub is minimized or avoided. This allows the hub section to be simply welded into position without taking any extra precautions such as bolting on the confronting coupling prior to welding, because the finished surface 39 will remain sufficiently flat that it will operate to provide the necessary seal even when such precautions are not taken. This not only simplifies the welding procedure, but allows interchangeable fittings to be used in matched relationship.

After the flanged hub 34 has been welded onto the pipe end, fastening ring 29 is moved over into position and pins 32 are driven through holes 33 until they seat into the groove 36. At this time, the flanged fitting 16 is assembled and in place, ready for use in providing a pipe joint according to this invention.

As mentioned above, the pipe fitting 14 is generally assembled, i.e., the fastening ring 29 is placed over the hub 21 and pins 32 driven into place, prior to the attachment of the fitting to the pipe 12. Thus, the screw flange of this invention is assembled into a single flanged unit and screwed onto the pipe end as is done with conventional pipe flanges. However, the screwing of the pipe flange constructed according to this invention is somewhat more difficult than with conventional flanges and it is preferred to utilize a special tool and method of assembling the coupling utilizing this fitting. Although this special tool and method has been devised specifically for assembly of the screw-type flanged pipe fitting of this invention, it will be appreciated that the general procedure and general tool structure will also be applicable to assembly of regular flanged pipe fittings.

Figure 6:
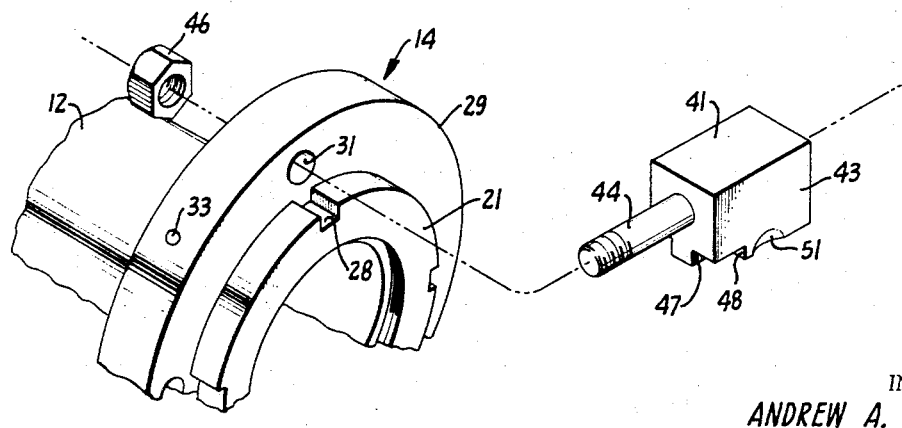
FIGURE 6 is an exploded view showing in greater detail certain elements of a part of the special tool illustrated in the installation procedure of FIGURES 4 and 5.

Thus, FIGURE 6 shows the initial stage of assembly of pipe fitting 14 onto pipe 12 where the fitting is manually screwed in place to provide the beginning engagement thereof. A pipe tool which comprises a pair of tool blocks and a lever is then utilized to screw up the fitting and provide a tight threaded attachment between the hub 21 of fitting 14 and pipe 12.

The tool utilized for tightening this fitting comprises a pair of tool blocks 41 and a lever 42 adapted to extend across the pipe fitting in engagement with both of the tool blocks, said tool blocks comprising a main body 43 having a threaded extension 44 adapted to extend through one of the holes 31 on the fastening ring 29 and receive a nut 46 for tightening the tool block in clamping engagement against hub 21.

Figure 5:
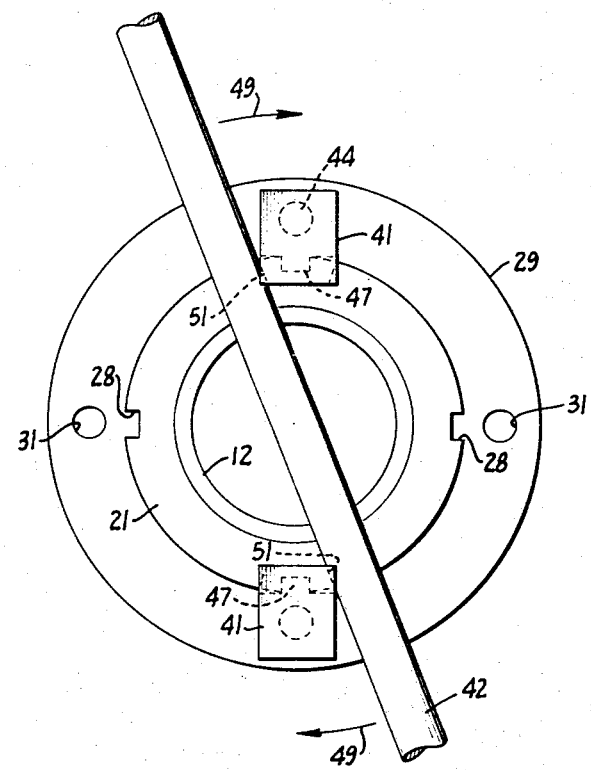
FIGURE 5 is an end view of the operation shown in FIGURE 4 for installing a threaded fitting constructed according to the invention.

In the preferred form, the tool blocks contain a boss 47 adapted to fit into an axially-extending recess 28 of hub 21, with the recess 28 and hole 31 being manually aligned prior to insertion. Surface 48 of the tool block will clampingly engage hub 21 and the tool blocks are firmly secured to the flanged fitting 14 so that they are rotatable therewith by a combination of this clamping action and the engagement of boss 47 in recess 28. With the tool blocks thus in place, lever 42 is inserted therebetween, as shown in FIGURE 5, and rotated as indicated by arrows 49 until the fitting is tightly engaged.

In general, the clamping forces alone are believed to be sufficient to prevent relative rotation between the ring and the hub, but the bosses and recesses are preferred to facilitate fastening. In addition, cut-aways 51 are provided in the preferred form to facilitate use of the lever. The lever construction can also be varied to fit in other ways, and may include means (not shown) to assist in the rotation thereof.

Thus, it is seen that the invention also provides a method for tightening a threaded flanged pipe fitting on a pipe end comprising the steps of clamping a pair of tool blocks to the flange of the pipe fitting, placing a handle in engagement with both tool blocks, and rotating the handle to turn the fitting until tight-threaded engagement is achieved. It is also seen that in the preferred method, the flanged pipe fitting has a flange with holes therein for receiving bolts and a pair of longitudinally-extending recesses which are positioned in axial alignment with the holes and the tool blocks each have a boss constructed to fit in one of said recesses. The tool block also contains a threaded extension formed to fit through a hole in the flange and the tool block is clamped by screwing a nut on the threaded extension, tightening the nut against the flange.

When utilizing this method of screwing the pipe fitting 14 in place on pipe end 12, it will be appreciated that the fitting may be screwed until snug without worrying about alignment of the holes 31 of fastening ring 29, because this fastening ring is rotatable with respect to the hub 21 21 after removal of the tool block. However, it will be appreciated that after the pipe joint is made by inserting the bolts 17 through aligned holes of the adjacent fittings, and tightening the fittings together by tightening action on nuts 18, the joint no longer has any ordinarily swivel characteristics. Nevertheless, the joint will selectively swivel rather than shear the bolts and thereby take up extraordinary shocks as mentioned above.

From the foregoing description, it is seen that I have provided an improved flanged pipe joint that comprises a novel flanged fitting which is easy to install, inexpensive to fabricate, and yet contains all of the advantages of the present flanged pipe joints together with improvements in the interchangeability of fittings in use.

I claim:

1. A pipe joint having a flanged fitting comprising a flanged hub for fitting over the end of and secured to the pipe to be joined to a flanged pipe element, a fastening ring fitting over the flanged hub and sized to fit laterally against the flange thereof, said flanged hub and fastening ring formed with all contacting surfaces oriented in a circular cylindric surface concentric to the pipe and in a plane perpendicular to the axis of the pipe, said fastening ring having a plurality of spaced holes for receiving securing bolts, and holding means for holding the fastening ring in position on the hub with the fastening ring held for relative rotation with respect to the hub.

2. The flanged pipe joint defined in claim 1, in which the flanged hub has a circumferentially-extending groove on the external surface of the main body thereof, and the holding means extends into said groove.

3. The pipe joint defined in claim 2, in which the holding means is in the form of a plurality of pins secured in said fastening ring.

4. The pipe joint defined in claim 2, in which the flanged hub is internally threaded and has longitudinally extending recesses in the external surface of the flange thereof, said recesses being formed to receive a tool suitable for screwing and tightening the hub on the pipe.

5. The pipe joint defined in claim 2, in which the flanged hub has a smooth-fitting inner surface suitable for welding to a pipe at its end.

6. The pipe joint defined in claim 2, in which the flanged hub is made of special corrosive-resistant material, and the fastening ring is made of steel.

7. The pipe joint defined in claim 1, in which two flanged fittings are provided for to form a coupling, which also comprises a plurality of bolts adapted to fit through the holes of the fastening rings of the two fittings, and nuts carried on the bolts for securing the fastening rings and clamping the hubs together.

References Cited

UNITED STATES PATENTS 2,374,574  4/1945  Adams _____ 285—368 X

FOREIGN PATENTS

| 380,607 | 12/1935 | Germany. |
| 1,141,237 | 12/1962 | Germany. |
| 849,826 | 9/1960 | Great Britain. |
| 984,036 | 2/1965 | Great Britain. |

CARL W. TOMLIN, *Primary Examiner.*

THOMAS F. CALLAGHAN, *Assistant Examiner.*

U.S. Cl. X.R.

285—368, 414, 416